Figure 1:
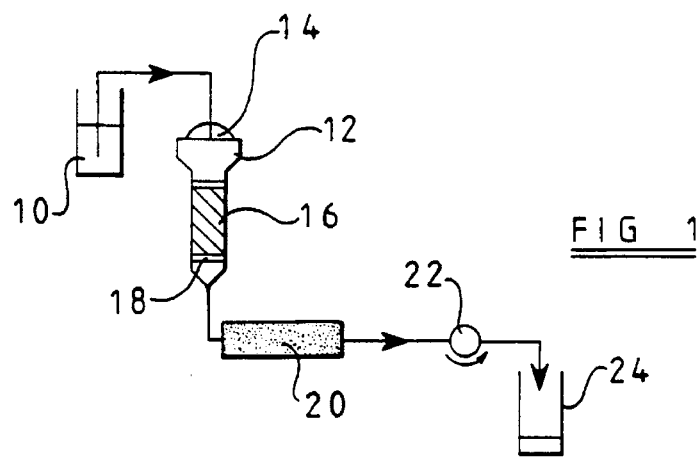

United States Patent [19]
Tolley et al.

[11] Patent Number: 5,597,484
[45] Date of Patent: Jan. 28, 1997

[54] METAL REMOVAL FROM AQUEOUS SOLUTION

[75] Inventors: Mark R. Tolley, Cambridge; Lynne E. Macaskie, Oxford, both of England

[73] Assignee: British Nuclear Fuels plc, Cheshire, England

[21] Appl. No.: 525,633

[22] PCT Filed: Mar. 25, 1994

[86] PCT No.: PCT/GB94/00626

§ 371 Date: Nov. 13, 1995

§ 102(e) Date: Nov. 13, 1995

[87] PCT Pub. No.: WO94/22770

PCT Pub. Date: Oct. 13, 1994

[30] Foreign Application Priority Data

Mar. 26, 1993 [GB] United Kingdom ............. 9306403

[51] Int. Cl.$^6$ ..................................... C02F 3/34
[52] U.S. Cl. .................. 210/611; 210/617; 210/912; 210/632; 435/262.5
[58] Field of Search ................ 210/610, 611, 210/615, 617, 912, 631, 632; 435/262, 262.5, 264

[56] References Cited

U.S. PATENT DOCUMENTS

| | | | |
|---|---|---|---|
| 4,789,478 | 12/1988 | Revis et al. | 210/611 |
| 4,826,602 | 5/1989 | Revis et al. | 435/262 |
| 5,047,152 | 9/1991 | Francis et al. | 210/912 |
| 5,292,456 | 3/1994 | Francis et al. | 210/611 |
| 5,441,641 | 8/1995 | Vail et al. | 210/611 |
| 5,520,811 | 5/1996 | Dirk et al. | 210/611 |

OTHER PUBLICATIONS

Macaskie, "An Immobilized Cell Bioprocess for the Removal of Heavy Metals from Aqueous Flows," Journal Chem. Tech. Biotechnology 49, pp. 357–379, 1990.

Macaskie, "Cadmium Accumulation by a Citrobacter", Journal of General Microbiology 133, pp. 539–544, 1987, (abstract).

Tolley, "Actinide and Lanthanum Accumulation by Immobilized Cells," Abstract Papers American Chemical Society, 1991 (abstract).

Macaskie, "Cadmium Accumulation by a Citrobacter," Biotechnology and Bioengineering 30, pp. 66–73, 1987 (abstract).

Macaskie, "The Effect of Aging on the Accumulation of Uranium by a Biofilm," Biotechnology Letter 14, pp. 525–530, 1992 (abstract).

Primary Examiner—Christopher Upton
Attorney, Agent, or Firm—Trexler, Bushnell, Giangiorgi & Blackstone, Ltd.

[57] ABSTRACT

Removal of a target metal having an insoluble phosphate (e.g. actinides), is effected by passing the solution through a bioreactor containing an immobilised phosphatase-producing microorganism which has been cultivated using a culture medium containing an assimilable organic source of phosphorus and which has been primed with an element, other than the metal to be removed, having an insoluble phosphate so as to deposit the phosphate of the priming element on cell surfaces of the microorganism. The priming element phosphate facilitates deposition of the target metal phosphate.

9 Claims, 3 Drawing Sheets

METAL REMOVAL FROM AQUEOUS SOLUTION

This invention relates to a method of removing a metal from an aqueous solution and is more particularly concerned with a method involving enzymically-mediated metal precipitation (biomineralization). Such a method can be used, for example, for one or more of the following purposes:

(a) water purification, (b) recovering of metals from water which is used in a washing or other process, for example water which has been used in the treatment of precious metal ores, (c) accumulation of heavy metals from water which has been used to treat soils for the purpose of removing heavy metals from such soils, and (d) cleaning-up of chelated metal wastes where, for example, the metal may be bound in an organic ligand complex, e.g, citrate.

It has been previously proposed in "An immobilised cell bioprocess for the removal of heavy metals from aqueous flows", L. E. Macaskie, J. Chem. Technol. Biotechnol., 49, 357–379 (1990), to effect heavy metal removal using Citrobacter sp. wherein the biomass is cultivated using glycerol-2-phosphate to prepare the biomass cells in the correct physiological state for metal removal. Metal removal relies upon the co-presentation of the metal with glycerol-2-phosphate (G2P) in an amount of up to 5 mM as a phosphate donor for metal accumulation by the immobilised cells. The G2P is enzymically cleaved to glycerol (a potential energy source for the cells) and inorganic phosphate, an efflux of which intercepts the incoming metal and results in the precipitation of crystalline heavy metal phosphate.

It is an object of the present invention to provide a method for the removal of a metal from aqueous solution with improved efficiency.

According to the present invention, there is provided a method of removing a metal having an insoluble phosphate (hereinafter called the "target metal") from an aqueous solution, said method comprising the steps of immobilising in a bioreactor a phosphatase-producing microorganism which has been cultivated using a growth medium containing an assimilable organic source of phosphorus; contacting the microorganism with an element, other than the target metal, having an insoluble phosphate (hereinafter called the "priming element") so as to deposit the phosphate of the priming element on cell surfaces of the microorganism; and subsequently passing the aqueous solution containing the target metal to be removed through the bioreactor in order to precipitate the target metal out of said solution.

We have found it particularly convenient to provide a prolonged period of contact between the priming element and the microorganism before passing the aqueous solution containing the target metal through the bioreactor. Most preferably, the priming element is dissolved or dispersed in a liquid (usually aqueous) medium which is maintained in contact with the immobilised microorganism in the bioreactor. Preferably, the liquid medium is contacted with the microorganism under stationary flow conditions for a period of time of at least 2 hours and more preferably at least 16 hours before the aqueous solution containing the target metal is passed through the bioreactor. The contacting step may be effected by first contacting the microorganism with a liquid medium containing the priming element in a first concentration followed by a storage step wherein the microorganism is maintained in contact with the liquid medium containing the priming element in a second concentration which is lower than said first concentration eg lower by a factor of 100.

Alternatively, the contacting step may be effected in such a way that the priming element is present in an outflow from the bioreactor. By ensuring that, during the contacting step, the priming element is present in the outflow from the bioreactor, the subsequent removal of the target metal from the aqueous solution can be optimised. Ensuring that the priming element is present in the outflow from the bioreactor can be achieved by (a) ensuring that the phosphatase activity of the bioreactor is relatively low or (b) ensuring that the phosphatase activity in the bioreactor is relatively high and at the same time using a high flow rate of the priming element through the bioreactor during the contacting step. The use of either of these techniques (a) and (b) would not be expected to optimise target metal removal. In case of technique (a), maximising phosphatase activity would normally be expected to maximise the deposition of the phosphate of the element on the cell surfaces of the microorganism and thereby potentially maximise metal removal. Conversely, the use of a low phosphatase activity bioreactor should minimise metal removal. The use of technique (b) is surprising because, whilst maximising the phosphatase activity would normally be considered desirable as noted above, the use of a rapid flow rate of the priming element through the bioreactor would be expected not to be an effective way of promoting deposition of the phosphate of the priming element on the cell surfaces. It is believed that, if the operating conditions are chosen such that the phosphatase activity is maximised and that the priming element is introduced into the bioreactor at a relatively slow rate of flow, then the formation of the phosphate of the priming element on the cell surfaces of the microorganism will take place almost exclusively in a relatively confined region at the inflow end of the bioreactor and that is expressed as an almost complete removal of the priming element from solution. Some of the bioreactor is functionally redundant since virtually all of the priming element was removed at the inflow end region. Thus, there is a dearth of sites beyond the inflow end region of the bioreactor at which the priming element phosphate provides a focus for the subsequent precipitation of target metal. Operating the contacting step in such a way that the priming element is present in the outflow from the bioreactor, eg by running the bioreactor at a rapid flow rate, is believed to result in the priming element phosphate being deposited throughout the entire effective area and length of the bioreactor, thus optimising the subsequent removal of the target metal from the aqueous solution. Thus, operating the contacting step in what would appear to be an ineffective manner actually results in an improvement in the efficiency of target metal removal as compared with the case where the contacting step is effected in a manner which would otherwise be expected to produce an improved efficiency of target metal removal.

The present invention is particularly suitable for the removal of actinides, e.g. uranium (in the form of $UO_2^{2+}$), neptunium and americium, from aqueous solution. The invention is also considered to be suitable for removing cadmium, lead, copper, nickel, zinc, manganese, cobalt, lanthanum, yttrium, europium and silver from aqueous solution. However, the invention is believed to be broadly applicable to the removal from aqueous solution of any metal(s) or metalloid(s) having a phosphate of a suitably low solubility product under the conditions existing in the bioreactor at the metal removal stage. The term "target metal" as used herein is to be construed accordingly.

As far as the choice of the priming element is concerned, any element can be used provided it has a solubility product such that it remains deposited on the cell surfaces of the microorganism and provides a suitable nucleating surface for the subsequent deposit of the target metal. Examples of elements which may be useful for the contacting step include lanthanum or another lanthanide, uranyl ion, iron, lead, cadmium and manganese, with lanthanum or uranyl ion being preferred; the "priming" deposit is thought to be $LaPO_4$ or $HUO_2PO_4 \cdot nH_2O$, respectively.

The microorganism chosen is preferably one which produces a suitable phosphatase, and is preferably the Citrobacter sp. used e.g. in Macaskie (supra). However, other microorganisms may be used, for example, *Providencia rettgeri* NCIMB 10457 which precipitates $LaPO_4$.

The present invention will now be described in further detail.

EXAMPLE 1

1. Growth and Immobilization of Cells Cell Strain

A known Citrobacter strain N14 (NCIMB No. 40259) originally obtained from a soil sample was used in this study under a licensing agreement from Isis Innovation, Oxford. The strain was maintained on nutrient agar (Difco) plates at 4° C., with subculturing at approximately six month intervals.

Growth Medium A

Cells were routinely grown in a defined minimal medium made up as a concentrated solution as follows: To 120 g TRIS (2-amino-2-(hydroxymethyl)-propane-1,3-diol) buffer dissolved in 250 ml water, approximately 200 ml 4.45M hydrochloric acid was added to give a solution of pH of approximately 7.0. To this, the following salts were added: 9.6 g ammonium sulphate, 0.63 g magnesium sulphate ($MgSO_4 \cdot 7H_2O$), 6.2 g potassium chloride, 6.7 g sodium 2-glycerophosphate (5.5 $H_2O$), 1 ml of a 0.032 g in 10 ml solution of ferrous sulphate ($FeSO_4 \cdot 7H_2O$) and 30 g glycerol. The final pH was readjusted as necessary to 7.0 with 2M HCl. The volume was made up to one litre with distilled water and the medium concentrate was stored at 4° C. For growth of cells, the stock medium was diluted ten-fold and sterilised by autoclaving before use.

Batch Culture of Cells

*Citrobacter* inocula were from stock plates and were serially subcultured three times in 100 ml conical flasks containing 20 ml sterile minimal medium (Growth Medium A) at 30° C. with shaking (inoculation volume 0.5–1.0 ml). The third subculture was used as the inoculum for the main batch growth which was carried out in a 5 litre conical flask containing 3 liters of sterile minimal medium. Aeration and mixing was by the use of three hollow aeration tubes connected to a compressed air supply through which air was passed to the culture. All batches were grown at 30° C.

Cells were harvested at early stationary phase (16–24 h) by centrifugation at 5000 rpm for 15 minutes in 250 or 500 ml centrifuge bottles (Mistral 6L or Beckmann J2-21ME centrifuge, respectively). The cells were resuspended in 40 ml isotonic saline (8.5 g/l) per tube and transferred to 50 ml capacity pre-weighed centrifuge tubes. After pelleting by centrifugation (Denley bench top centrifuge, 5000 rpm, 15 minutes), the cells were washed again in 40 ml saline per tube and again pelleted. Excess water was allowed to drain off by standing the tubes inverted for 1 hour, after which tubes were re-weighed to determine the total cell wet weight.

Determination of Phosphatase Specific Activity

Phosphatase specific activity was determined by p-nitrophenol release from p-nitrophenyl phosphate as follows: 30 ml cell culture, pelleted as above, was washed twice in saline and resuspended in 3 ml isotonic saline. Cell concentrate was added to 1.8 ml 200 mM MOPS (3-[N-morpholino]-propanesulphonic acid)/NaOH buffer pH 7.0 at 30° C. as required to give an $OD_{600}$ (optical density at 600 nm) of 0.35 to 0.4. The final volume was 2 ml, with the difference made up with water, and the reaction was initiated by the addition of 0.4 ml of a 15.8 mg/ml (46.5 mM) solution of p-nitrophenyl phosphate to the tube. The reaction was quenched when an appreciably yellow colour was evident, usually at 30 seconds to 20 minutes (depending upon the activity of the culture) by the addition of 5 ml 200 mM NaOH. The absorbance of the yellow solution was read at 410 nm and converted to nmol of liberated p-nitrophenol by reference to a calibration (Varian spectrophotometer). A control value obtained by adding the NaOH before the substrate to an identical tube was subtracted to give $\delta A$, the absorbance caused by p-nitrophenol release by the phosphatase. Cell protein in the sample was estimated by determining the $OD_{600}$ of the equivalent amount of cell concentrate and water in 1.8 ml 200 mM MOPS buffer against a MOPS buffer blank, and estimation of the protein per $OD_{600}$ unit as assayed by the Lowry method (R. M. Empson, FHS Biochemistry Part II Dissertation, Oxford 1988). The protein content (mg protein in assay per $OD_{600}$ unit) was 0.580 (B. C. Jeong D. Phil Thesis, University of Oxford, 1992).

Phosphatase specific activity (Sp.Act.) was determined from the following equation:

$$\text{Sp.Act.} = \frac{\delta A \times 10^9}{\epsilon_{410}} \times \frac{7.4}{1000} \times \frac{1}{0.580 \times OD_{600} \times t}$$

where $\delta A$=Absorbance at 410 nm ($A_{410}$) due to liberated p-nitrophenol 7.4/1000=Dilution factor of assay $\epsilon_{410}$=Extinction coefficient of p-nitrophenol at $A_{410}$ under the conditions of the assay (average value 18580)

$0.580 \times OD_{600}$=mg protein in assay determined using a replicate tube unsupplemented with substrate or NaOH (see above)

t=time of assay in minutes

This can be simplified to:

$$\text{Sp.Act} = \frac{686.7 \times \delta A}{OD_{600} \times t} \quad \text{nmol product/min/mg(bacterial protein)}$$

This latter formula was used for all specific activity calculations.

Immobilisation Procedure

Pelleted cells (5 g wet weight) were resuspended in approx 35 ml isotonic saline in a 50 ml glass tube stoppered at one end. One drop of an antifoam agent (polypropylene glycol), 5 g acrylamide monomer and 0.5 g N,N'-methylenebisacrylamide were added, and the tube was sparged with oxygen-free nitrogen for 2–3 min. 5 ml 2.5% (w/v) aqueous potassium persulphate and 5 ml 5% (v/v) aqueous 3-dimethylaminopropionitrile were added to start the reaction; the tube was stoppered at the top, shaken by inversion until polymerisation had started and left to polymerise at 4° C. for at least one hour. The gel was shredded through a stainless steel mesh and divided into fifty portions by weight (0.1 g wet weight cells per portion). Each portion was washed twice in saline to remove unpolymerised gel components and nonimmobilised cells and stored for at least one week at 4° C. before use.

Preparation of Apparatus

An apparatus was set up as shown schematically in accompanying FIG. 1, the apparatus comprising a vessel 10 containing input solution, a disposable 2 ml working volume plastic column 12 closed at the top by a sealed cap 14 and containing a bed 16 (approx 1 ml) of polyacrylamide gel containing immobilised cells, supported on a polystyrene frit support 18. A portion of shredded polyacrylamide gel (containing 0.1 g wet weight cells) in saline was packed into the column 12 (as supplied by Pierce and Warriner) to form the bed 16. The apparatus further comprises a cotton wool (non-absorbent) filter 20 (not used in certain of the experiments), a peristaltic pump 22 and a scintillation vial 24. The cotton wool filter 20 was manufactured as follows:- the tip of a short glass pasteur pipette was removed and the broken end flame-polished. A short length of silicone tubing was put over the pointed end, and this was held closed while the barrel was filled with distilled water. 0.5 g non-absorbent cotton wool was weighed out and soaked in distilled water. Small tufts were squeezed to remove air bubbles and packed into the barrel, filling it almost to the top. Room temperature (20° C.) was used throughout the experiments. To prevent leakage, the pump 22 was placed after the column 12. Solution was drawn through the column 12 under negative pressure via pump 22 so that, if the seals were not airtight, solution would not be drawn into the apparatus and the leak would be apparent. Air leakage inwards or solution leakage outwards was prevented by the use of a seal around the cap 14 which comprised two sealants; Whiteseal (Bostik Ltd) was smeared around the cap 14 and allowed to dry for 2–3 hours, and was then covered with a flowable silicone rubber compound (RS Components Ltd) and left for 24 hours to cure.

2. Priming with Lanthanum Flows

Priming Solution

Stock solutions of 100 mM lanthanum nitrate in distilled water, 200 mM tri-sodium citrate/citric acid buffer pH 6.9, 500 mM sodium 2-glycerophosphate in distilled water and 200 mM MOPS/NaOH buffer pH 7.0 were made up and stored at 4° C. Priming solution was made up by diluting the stock solutions in distilled water to make a final solution consisting of 1 mM lanthanum nitrate, 2 mM citrate buffer, 5 mM sodium 2-glycerophosphate and 50 mM MOPS buffer. The lanthanum and citrate stock solutions were allowed to mix before adding the other components to ensure that hydroxylation of the metal was suppressed by complexation with citrate.

Test Solution

A test solution containing 10 μM lanthanum was made up by dilution of the above stock solutions to make a solution containing 10 μM lanthanum nitrate, 0.5 mM citrate buffer, 5 mM sodium 2-glycerophosphate and 50 mM MOPS buffer pH 7.0. The lanthanum and citrate stock solutions were allowed to mix before adding the other components to ensure that hydroxylation of the metal was suppressed by complexation with citrate.

Arsenazo III Assay for Lanthanum

Arsenazo III is a non-specific, sensitive reagent that detects a number of heavy metals by forming a red/pink to violet complex. A saturated solution was prepared as follows: 0.038 g of arsenazo III was added to 25 ml distilled water and the solution stirred for at least one hour. The solution was then filtered through a Whatman No 1 qualitative filter paper to remove undissolved reagent. The following protocol was developed for detection of lanthanum in the priming solution. Priming solution (for 1 mM lanthanum soln) was diluted 10-fold in 2 mM citrate buffer pH 6.9/5 mM sodium 2-glycerophosphate to give a total solution volume of 2.0 ml (i.e, 0.2 ml of lanthanum solution plus 1.8 ml of buffer). To this 0.3 ml of 0.75M hydrochloric acid and 0.1 ml arsenazo III reagent (prepared as above) were added. The tubes were mixed on a "Whirlimix" for a few seconds and the colour was read at an absorbance of $652_{nm}$ versus a reagent blank made with 2.0 ml of the buffered solution.

For assay of a solution containing a low concentration of lanthanum (10 μM, as in the test solution), the dilution step was not done and the solution was assayed directly.

Priming Procedure A 20 ml of the above priming solution was passed through the column 12 at 6 ml/h to give a lanthanum removal of 100% (as measured by the arsenazo III assay), i.e, any residual lanthanum in the outflow from the column 12 was below the detection limit for the assay. This was immediately followed by 25 ml of the test solution to ensure that columns were active against low concentrations of metal so as to check that there was still phosphatase activity ie efficient removal of priming metal.

Priming Procedure B 30 ml of the above priming solution was passed through the column 12 at two flow rates (approx 26 and 15 ml/h) giving 80–90%, and 95% lanthanum removal, respectively. This was followed by 25 ml of the test solution to ensure that columns were active against low concentrations of metal (100% removal of 10 μM lanthanum).

3. Testing Actinide-Containing Flows

Test Americium Solution

Solutions containing americium were made up as follows: 100 nCi of $^{241}$americium nitrate was dispensed to a glass scintillation vial. To this were added, in order, 1 ml 5 mM tri-sodium citrate/citric acid buffer pH 6.9, 2.5 ml 200 mM MOPS/NaOH buffer pH 7.0, 0.1 ml 500 mM substrate (sodium 2-glycerophosphate) and 6.4 ml distilled water. The final americium concentration was 11 nM; the activity was 10 nCi/ml.

Test Neptunium Solution

Solutions containing neptunium were made up as follows: 0.05 ml of a 1 μCi/ml solution of commercially obtained $^{237}$neptunium in 8M nitric acid was dispensed to a polypropylene scintillation vial. To this were added, in order, 1 ml 5 mM tri-sodium citrate/citric acid buffer pH 6.9, 2.5 ml 200 mM MOPS/NaOH buffer pH 7.0, 0.1 ml 500 mM substrate (sodium 2-glycerophosphate), 6.4 ml distilled water and 0.1 ml 4M NaOH. The NaOH was necessary to neutralise the nitric acid in which the neptunium was supplied; the final pH (in equivalent solutions not containing neptunium) was 6.8. The final neptunium concentration was 30 μM; the activity was 5 nCi/ml.

Experimental Procedure

Experiments were run at the slowest setting of the pump 22 (about 6 ml/h) and 20° C. 10 ml of the test solution without actinide was run through the column 12 to equilibrate it, immediately followed by 10 ml actinide test solution. Approximately 2 ml fractions of outflow were collected in pre-weighed scintillation vials 24 The precise volume of outflow was calculated from the weight of the vial before and after collection, using a conversion factor of 1.0 ml per g.

Measurement of Actinide Concentration

For $^{241}$americium, samples were gamma-counted either in a Packard autogamma 5000 series liquid gamma counter set at 35–80 keV or in a sodium iodide solid waste gamma counter (Nuclear Silica Products with Fabcast shielding and Ortec analyser, specially fabricated for the National Radiological Protection Board), which permitted counting of the column and tubing and hence calculation of activity balances. Samples were counted for ten minutes each and the resulting counts per minute (CPM) converted to disintegrations per minute (DPM) by use of a conversion factor calculated from a source of known DPM. Background CPM were determined from a vial containing water added to each counting run and subtracted from all experimental CPM. A 0.2 ml sample from the input solution was also counted; from this the expected input DPM for each output fraction was calculated and thus the percentage activity removed from each fraction was determined. Counting errors were less than 1%, thus errors in percentage removal were less than 2%.

For $^{237}$neptunium (and the decay product $^{233}$protactinium), 10 ml Pharmacia Hisafe II biodegradable scintillation cocktail was added to each 2 ml fraction. Scintillation vials were gently mixed to ensure sample acceptance by the cocktail and counted on an LKB 1217 rackbeta scintillation counter for ten minutes, using the 100–200 channels. Background (scintillant and reaction mix without neptunium) was subtracted from each reading to give CPM and 0.1 ml and 0.2 ml samples of the input solution were used to estimate input counts. Percentage removal of the combined $^{237}$Np and $^{233}$Pa was determined as for $^{241}$americium.

Results

Figure 2:
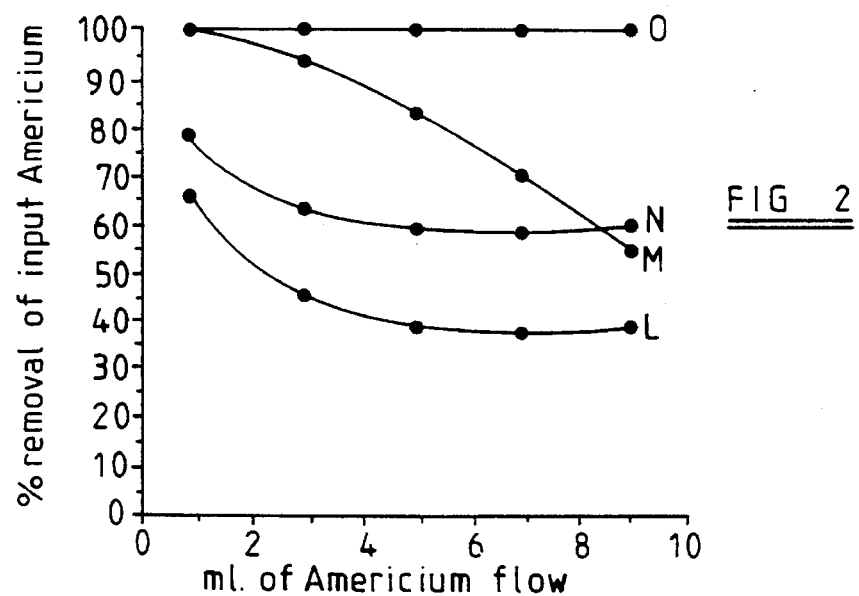

The results achieved for removal of americium are shown in the graph of FIG. 2 where % removal of americium is plotted against ml of americium flow for various column preparation techniques L to O.

In Technique L (Comparison), the column 12 was used with low phosphatase activity cells (phosphatase deficient mutant M1—specific activity 10 units—produced by ethyl methanesulphonate (EMS) mutagenesis [Owen, S., Jeong, B. C., Poole, P. S. and Macaskie, L. E. (1992) Tributyl phosphate degradation by immobilised cells of a Citrobacter sp. Applied Biochemistry & Biotechnology 34/35, 693–707]), no filter 20 and no priming procedure at all. This gave a total removal of only about 35%. Technique M (Invention) involved the use of cells of the phosphatase deficient mutant M1 (specific activity 10 units) in the column 12, without any priming but with the filter 20. This gave an initial high removal of americium, but then the removal fell away giving about 55% total removal, still a marked improvement over technique L.

Technique N (Invention) involved the use of high phosphatase activity cells (specific activity 1980 units) in the column 12 with priming procedure A but without filter 20. This also gave an initial high removal of americium, whilst the removal rate fell away quite sharply, the total removal rate was nevertheless about 60%.

Technique O (Preferred Method) involved the use of high phosphatase activity cells (specific activity 1163) in the column 12 with the filter 20 and with the priming procedure B using both flow rates in independent tests. The data for technique O as shown in FIG. 2 was obtained in each case. As can be seen, this resulted in about 100% total removal of the americium.

Figure 3:
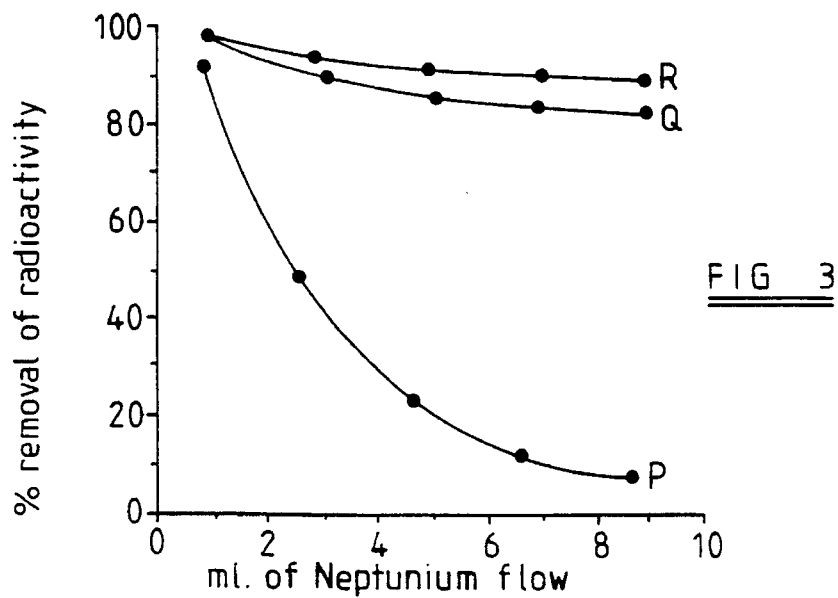

The results achieved for removal of neptunium (including its decay product $^{233}$Pa) are shown in the graph of FIG. 3 where % removal of radioactivity is plotted against ml of neptunium flow for various column preparation techniques P to R.

Technique P (Invention) involved the use of cells of high phosphatase activity (specific activity 1980 units) in the column 12, with priming procedure A and with the filter 20. This gave an initial high removal of neptunium, but radioactivity removal fell to approx 10% after 7 ml of flow.

Technique Q (Preferred Method) involved the use of high phosphatase activity cells (specific activity 1163 units) in the column 12 with priming procedure B at both flow rates in the same test and with the filter 20. This gave a total radioactivity removal of about 85%.

Technique R (Preferred Method) involved the use of high phosphatase activity cells (specific activity 1163) in the column 12 with priming procedure B at both flow rates in the same test, and with the filter 20. As can be seen, this resulted in about 90% total removal of radioactivity.

The slight variation in the results obtained for techniques Q and R is attributed to the neptunium flow rate through the column. In technique Q, this flow rate was 5.8 ml/h, whilst in technique R this flow rate was 7.3 ml/h.

EXAMPLE 2

Example 1 was repeated except for the following:

1. Instead of experiments using Am and $^{237}$Np and Growth Medium A, experiments were conducted using $^{237}$Np/$^{239}$Np (see below) and a Growth Medium B which was the same as Growth Medium A but with the final glycerol concentration reduced to 2.5 g/l (25 g/l in the medium concentrate).

2. A priming procedure was used which involved passing various amounts of the priming lanthanum solution described in Example 1 through the column 12 at various flow rates such as to give a range of efficiencies of La removal as indicated in the Table below:

| Test | Amount of Priming Soln (ml) | Flow Rate ml/h | % La Removal |
|------|------|------|------|
| A | 20 | 20 | 100 |
| B | 20 | 9 | 76.6 |
| C | 50 | 50 | 12 |
| D | 50 | 20 | 21 |

This was followed by washing in 25 ml of the 10 µM La test solution at the same rate as the priming solution and storage in such Test Solution until use the next day or some days later.

3. Test Neptunium solutions were made up using 0.05 ml of a 1253 Bq/ml solution of $^{237}$Np in 8M $HNO_3$ plus 0.05 ml of a solution of $^{239}$Np that was about 1200 counts/sec/ml (in 8M $HNO_3$). The same additions as in Example 1 were used with the exception that 6.3 ml and 0.2 ml, respectively, of the distilled water and 4M NaOH were used, and that the pH was checked to be pH 6.5–7.20 before use and adjusted as necessary with an extra 1–2 drops of 4M NaOH to bring the pH to 6.5 to 7.20.

4. In the Experimental Procedure, 5 ml of the Test Neptunium Solution of Example 1 (but without the neptunium or the NaOH) was passed through the primed column 12 at rates of 6–9 ml/h to equilibrate it before passing 10 ml of the Test Neptunium Solution of 3 above therethrough immediately at the same rates. The output from the column 12 was collected in fractions of approximately 2 ml and the radioactivity of the fractions was counted.

5. In measurement of Actinide Concentrations, for $^{239}$Np, counting was effected using a Canberra High Resolution germanium detector connected to a Nuclear Data multi-channel analyzer.

Figure 4:
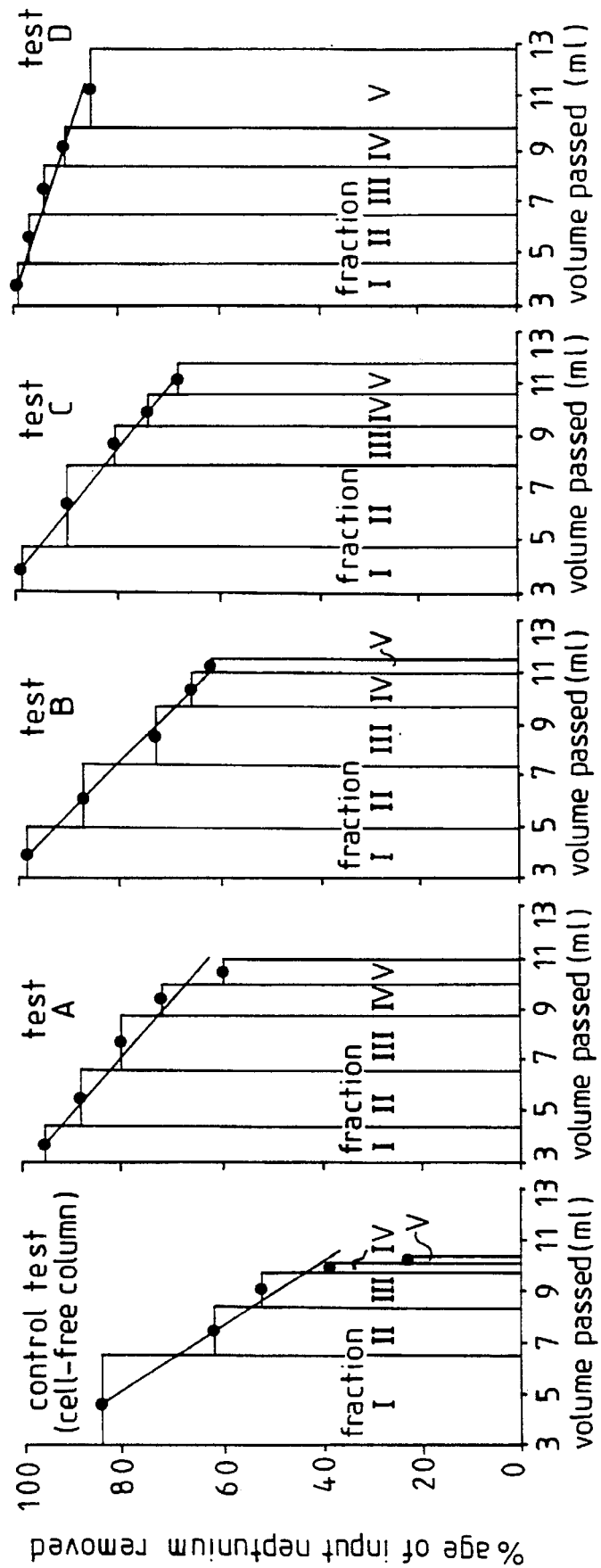

The unexpected effects produced by utilising a priming procedure in accordance with the present invention will be appreciated from a consideration of attached FIG. 4 in which the control column was a cell-free column where no lanthanum had been removed during priming and which only gave an Np removal of 40% at the 10 ml stage. Test A to D (which corresponded to percentage La removal figures of 100%, 76.6%, 12% and 21%, respectively, during priming) gave percentage Np removal figures at the 10 ml stage of 67%, 66%, 74% and 89%, respectively, of the input solution, ie the two columns (A and B) which would be expected to give the best results gave the two worst results and vice versa.

Figure 5:
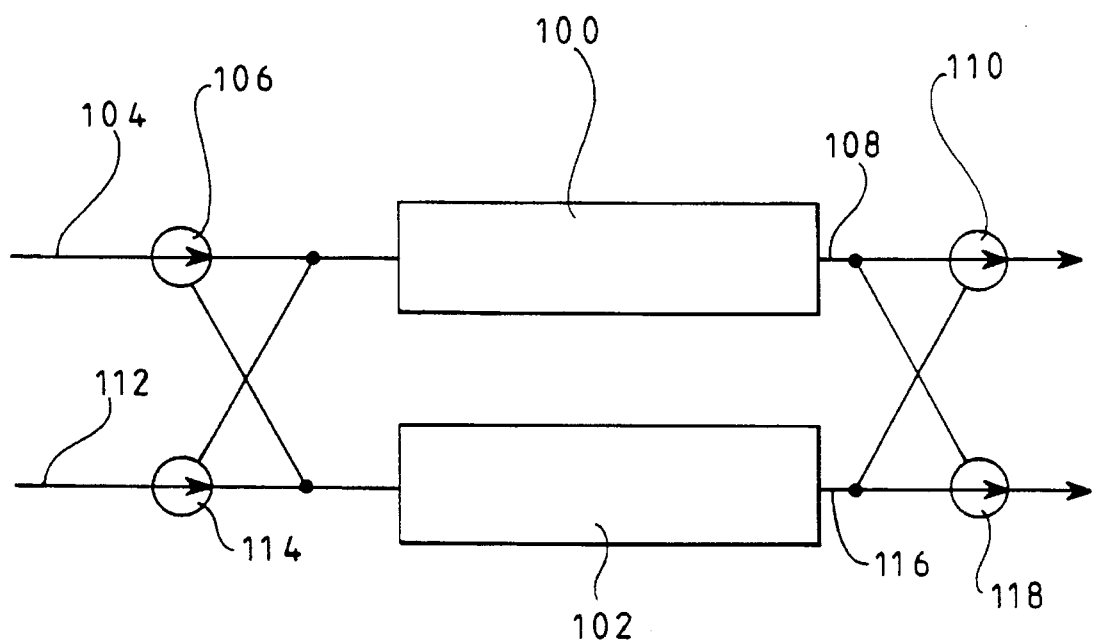

Referring now to FIG. 5, there is illustrated a schematic diagram of a system for recovery of metal from solution on a quasi-continuous basis using two through-flow bioreactors 100 and 102 in a cyclical manner. Whilst bioreactor 100 is being primed via using inflow line 104, inflow changeover valve 106, outflow line 108 and outflow changeover valve 110, the other bioreactor 102 with primed cells distributed over the length thereof is being used to remove metal from solution using inflow line 112, inflow change-over valve 114, outflow line 116 and outflow change-over valve 118. When desired, the change-over valves 106, 110, 114 and 118 can be operated to enable the bioreactor 102 to be primed whilst the bioreactor is being operated to remove metal from solution.

We claim:

1. A method of removing a metal having an insoluble phosphate (hereinafter called the "target metal") from an aqueous solution, said method comprising the steps of immobilising in a bioreactor a phosphatase-producing microorganism which has been cultivated using a growth medium containing an assimilable organic source of phosphorus; contacting the microorganism with an element, other than the target metal, having an insoluble phosphate (hereinafter called the "priming element") so as to deposit the phosphate of the priming element on cell surfaces of the microorganism; and subsequently passing the aqueous solution containing the target metal to be removed through the bioreactor in order to precipitate the target metal out of said solution.

2. A method as claimed in claim 1, wherein the priming element dissolved or dispersed in a liquid medium is maintained in contact with the immobilised microorganism in the bioreactor.

3. A method as claimed in claim 2, wherein the liquid medium containing the priming element is maintained in contact with the immobilised microorganism in the bioreactor under stationary flow conditions.

4. A method as claimed in claim 3, wherein the stationary flow conditions are maintained for at least 2 hours.

5. A method as claimed in claim 1, wherein the contacting step is effected by passing the priming element through the bioreactor in such a way that the priming element is present in an outflow from the bioreactor.

6. A method as claimed in claim 1, wherein the target metal is uranium, neptunium, americium, cadmium, lead, copper, nickel, zinc, manganese, cobalt, lanthanum, yttrium, europium or silver.

7. A method as claimed in claim 1, wherein the priming element is lanthanum or another lanthanide, uranyl ion, iron, lead, cadmium or manganese.

8. A method as claimed in claim 7, wherein the priming element is lanthanum or uranyl ion.

9. A method as claimed in claim 1, wherein the microorganism has the phosphatase-producing and metal precipitating properties of Citrobacter strain N14 (NCIMB 40259) or Providencia rettgeri (NCIMB 10457).

* * * * *